United States Patent [19]
Tally

[11] Patent Number: 5,877,690
[45] Date of Patent: Mar. 2, 1999

[54] BAYONET LOCK CONSTRUCTION FOR A CHIP DETECTOR

[75] Inventor: Kevin Tally, Clarinda, Iowa

[73] Assignee: Allen Aircraft Products, Inc., Ravenna, Ohio

[21] Appl. No.: 864,328

[22] Filed: May 28, 1997

[51] Int. Cl.⁶ .................................................. G08B 17/10
[52] U.S. Cl. ......................... 340/631; 340/596; 439/11; 324/204
[58] Field of Search ..................... 340/631, 627, 340/596; 439/11, 13, 481, 482; 324/437, 204, 234, 693, 631

[56] References Cited

U.S. PATENT DOCUMENTS

| | | | |
|---|---|---|---|
| 4,070,660 | 1/1978 | Tauber | 340/631 |
| 4,091,958 | 5/1978 | Zemke | 220/291 |
| 4,199,443 | 4/1980 | Tauber | 210/85 |
| 4,219,805 | 8/1980 | Magee et al. | 340/631 |
| 4,302,754 | 11/1981 | Magee et al. | 340/631 |
| 4,657,671 | 4/1987 | Botstiber et al. | 210/86 |
| 4,707,165 | 11/1987 | Tauber et al. | 96/174 |
| 4,731,578 | 3/1988 | Tsaprazis | 324/204 |

OTHER PUBLICATIONS

Lisle Corporation Catalog, "Magnetic Plugs", 1995, pp. 15, 16, 20 & 22.
Lisle Corporation Catalog, "Magnetic Plugs", pre–1995, pp. 15, 16, 20, 21 & 22.

*Primary Examiner*—Jeffrey Hofsass
*Assistant Examiner*—Ashok Mannava
*Attorney, Agent, or Firm*—Banner & Witcoff Ltd

[57] ABSTRACT

A chip detector assembly includes a body member with a cylindrical passage for receipt of a chip detector. The chip detector includes a triangular flange which cooperates with a congruent triangular window in the housing to permit the chip detector to engage and lock to the housing in any one of three equally spaced, distinct positions.

3 Claims, 4 Drawing Sheets

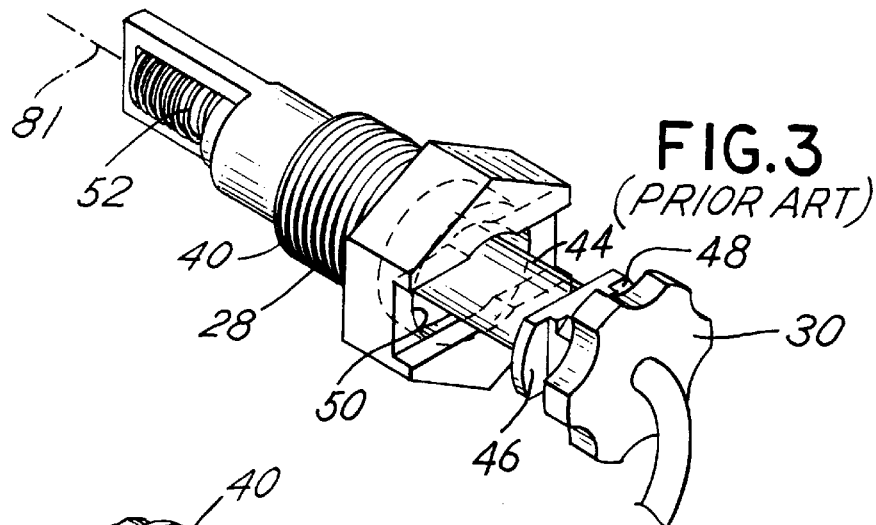
FIG. 3 (PRIOR ART)
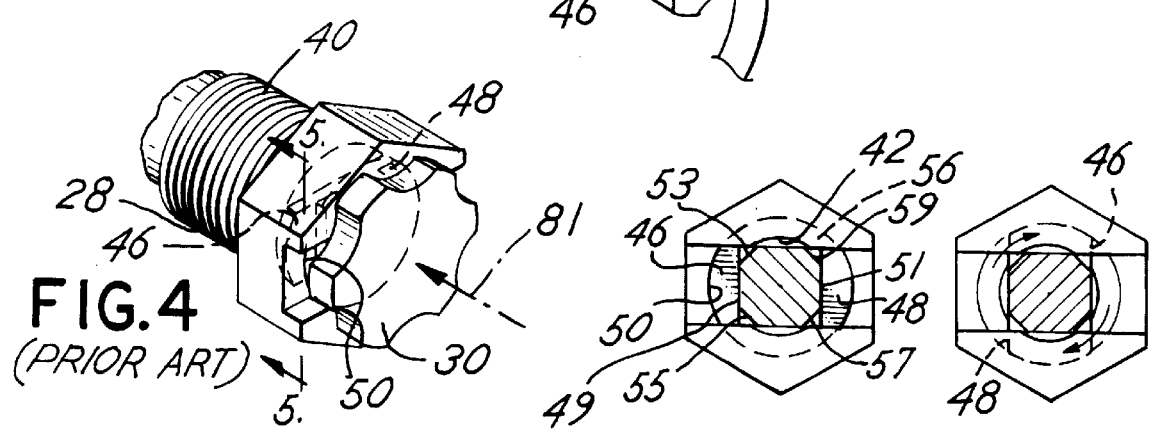
FIG. 4 (PRIOR ART)
FIG. 5 (PRIOR ART)
FIG. 6 (PRIOR ART)
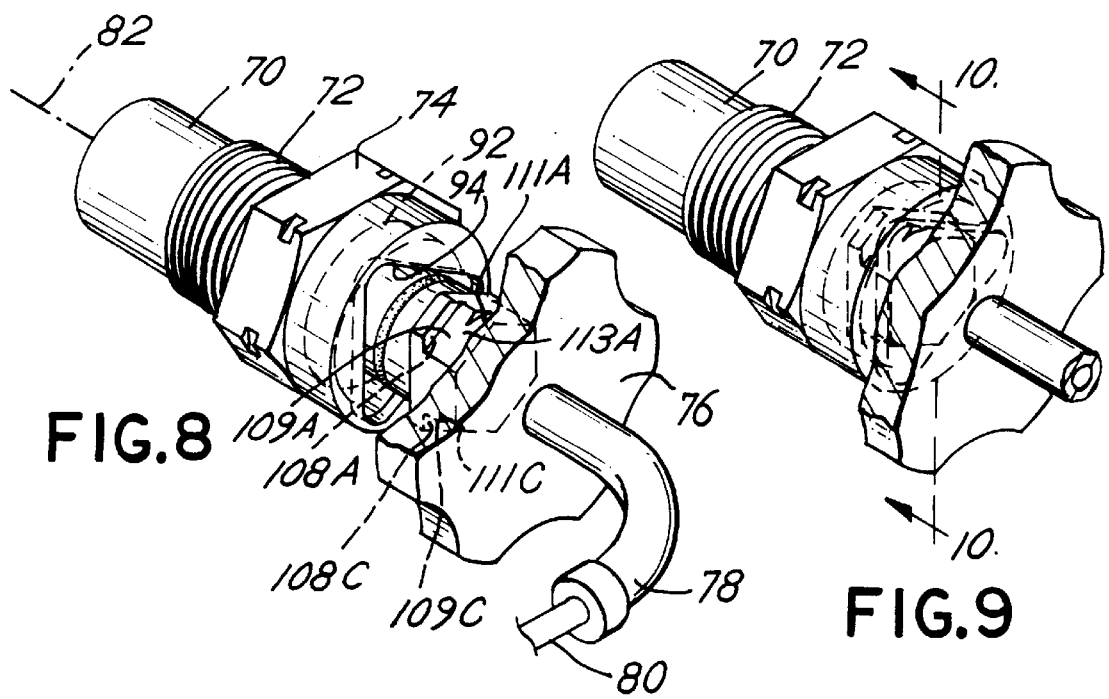
FIG. 8
FIG. 9

BAYONET LOCK CONSTRUCTION FOR A CHIP DETECTOR

BACKGROUND OF THE INVENTION

This invention relates to a chip detector assembly and, more particularly, to a chip detector assembly of the type which includes a valve body member that may be attached to or inserted into an engine block or transmission block and which further includes a chip detector that cooperatively fits into the valve body member.

The use of a chip detector assembly in combination with engines and with transmissions has been common, particularly in circumstances where the use of such an assembly provides an immediate and important indication of a need for servicing an engine or transmission. For example, aircraft engines and transmissions commonly use chin detectors which detect the presence of magnetically attracted metal chips in the transmission fluid or lubricating oil of the transmission casing or engine block. Detection of metal chips or shards is an indication of the need for servicing the transmission or engine.

Typically, a chip detector assembly includes a valve body member which is threaded into the engine block or transmission. A chip detector then connects into the valve body member. The chip detector typically includes a magnetic assembly which is designed to attract metal shards or particles. An electric connection associated with a detector circuit is provided to the chip detector to transmit a signal indicating the presence of metal shards or chips attracted by the magnetic assembly. In this manner, detection of a potential engine failure or a requirement for servicing of the engine or transmission is provided. As mentioned, such chip detector assemblies are especially useful in aircraft and other environments where failure of an engine or transmission may have a catastrophic result.

Typically the chip detector comprises a cylindrical or tubular housing which attaches into a cylindrical chamber in the valve body in one of two positions which are 180° apart. In this manner, the chip detector may be oriented in any one of two opposite directions to facilitate connection of electrical lead wires to the chip detector. There are occasions, however, when the availability of only two such orientations of the chip detector is not convenient, useful, efficient or adequate. Thus there has developed a need to provide a chip detector having connection positions to a valve body member with at least an additional alternative direction or orientation for attachment of the chip detector to the valve body member, particularly when the electrical connection to the chip detector is a right angle connector.

SUMMARY OF THE INVENTION

In a principal aspect, the present invention comprises a chip detector assembly of the type which includes a valve body member that may be attached to or inserted into an engine block or transmission casing. The valve body member includes a central bore which is adapted to receive a removable chip detector oriented in any one of three alternative connection positions. The chip detector includes a triangular, radial flange which is adapted to fit through a congruent or compatible window or opening in the valve body member. The valve body member includes a circular slot adjacent the window. The chip detector flange includes a relief or cut-out section associated with each triangular corner. The chip detector triangular flange may then be rotated or twisted after insertion through the valve body window in the circular slot so as to engage relief surfaces with the sides of the window and thereby lock the chip detector into place. A biasing member or spring biases the chip detector axially into the locked position within the valve body member. In this manner, because the chip detector includes a generally equilateral triangle shaped, radial flange which is adapted to fit into a congruent window of the valve body member, the chip detector may be oriented in any one of three positions which are 120° from one another. Because there are three alternative positions for connecting the chip detector into the valve body member, it is possible to orient the chip detector in a manner most convenient for connecting an electrical connector extending from the chip detector to detection circuitry.

Thus it is an object of the invention to provide an improved chip detector assembly of the type including a valve body member and a compatible chip detector.

It is a further object of the invention to provide an improved chip detector assembly which includes a chip detector having an electrical connector attached thereto which chip detector may be rotated into any one of three alternative positions approximately 120° from one another when joined to a compatible valve body member.

It is a further object of the invention to provide an improved chip detector assembly which has a rugged construction, is economical to manufacture, is easy to install and use, and which may be used with engines and transmissions in place of pre-existing chip detector assemblies without extensive alteration or change to the engine block or transmission.

These and other objects, advantages and features of the invention will be set forth in the detailed description which follows.

BRIEF DESCRIPTION OF THE DRAWING

In the detailed description which follows, reference will be made to the drawing, comprised of the following figures:

FIG. 3 is an enlarged perspective view of a typical prior art chip detector assembly of the type depicted in FIG. 2;

FIG. 4 is a perspective view of the assembled chip detector assembly of FIG. 3;

FIG. 5 is a cross sectional view of the chip detector assembly of FIG. 4 taken along the line 5—5;

FIG. 6 is a cross sectional view of the chip detector assembly of FIG. 5 wherein the chip detector associated with the assembly has been rotated 90° with respect to the valve body member;

FIG. 8 is an exploded perspective view of the chip detector assembly of FIG. 7;

FIG. 9 is an assembled chip detector assembly comprising a valve body member and chip detector of the type shown in FIG. 8;

DESCRIPTION OF THE PREFERRED EMBODIMENT

Figure 1:
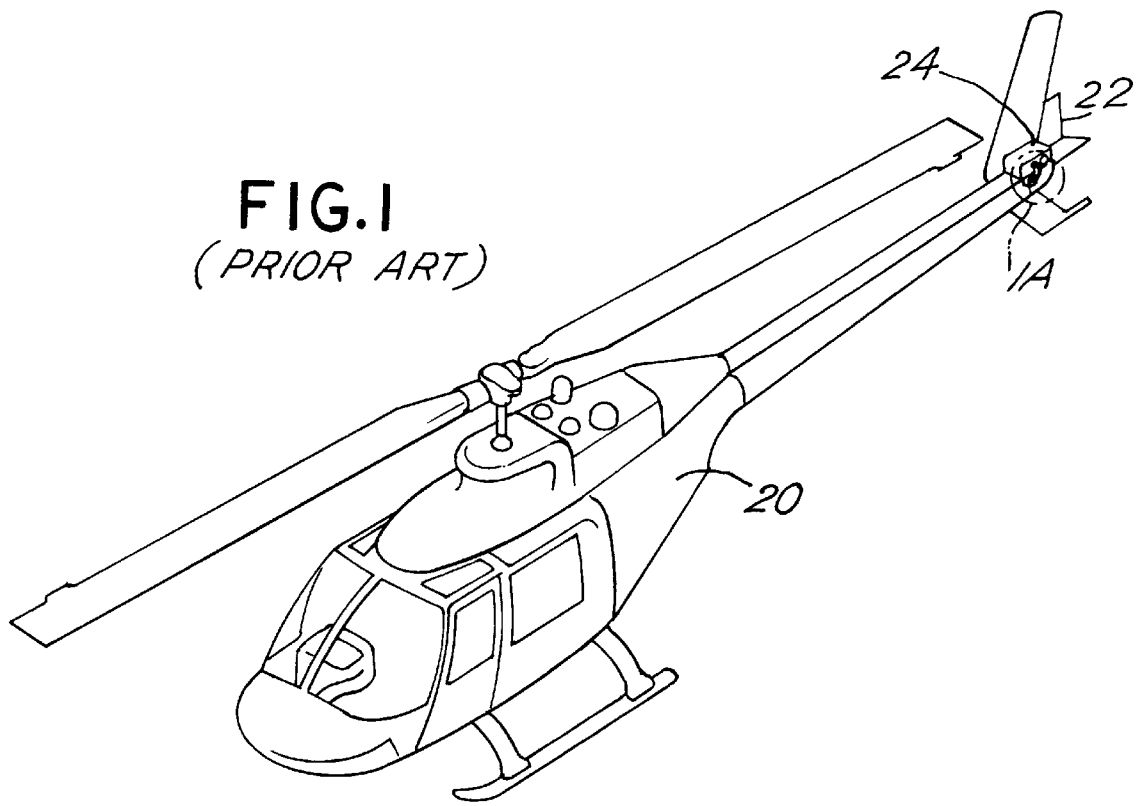
FIG. 1 is a perspective view of a typical environment in which a chip detector assembly is utilized wherein there is shown in an exploded detail view, a typical chip detector assembly installation in the gearbox housing of a tail rotor associated with a helicopter.
Figure 1A:
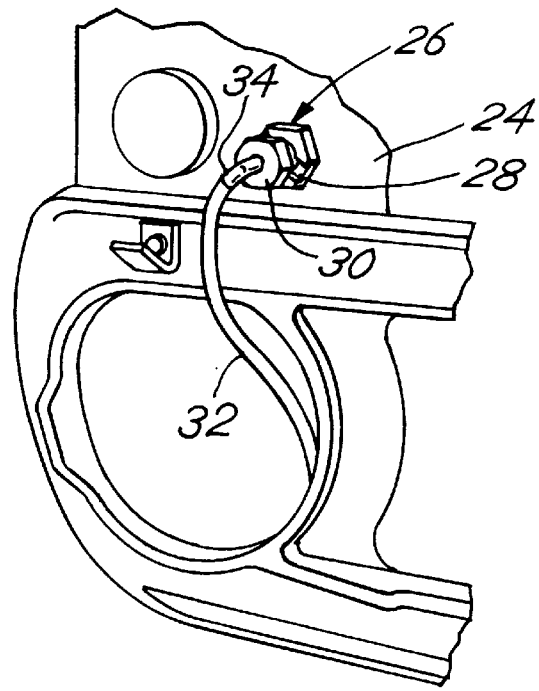
FIG. 1A is an enlarged detail view of a section of FIG. 1.

FIG. 1 depicts a helicopter 20 which includes a rear tail rotor 22. The rear tail rotor 22 is typically driven by appropriate gearing retained within a gearbox housing 24. The enlarged detail of FIG. 1 (FIG. 1A) illustrates the manner in which a chip detector assembly 26 is positioned in combination with the gearbox housing 24 to detect the presence of metal shards or chips responsive to magnetic fields. Specifically, the chip detector assembly 26 includes a valve body member 28 which is threadably inserted into the gearbox housing 24 and which includes a through passage as described in greater detail below. Inserted or fitted within the through passage of valve body member 28 is a chip detector 30. A lead wire 32 extends into the chip detector 30 and connects with a magnetic core piece (not shown). The opposite end of the lead wire 32 connects to appropriate circuitry which detects the presence of collected metal chips across a magnetic gap and thus the presence of chips within the gearbox housing 24.

Figure 2:
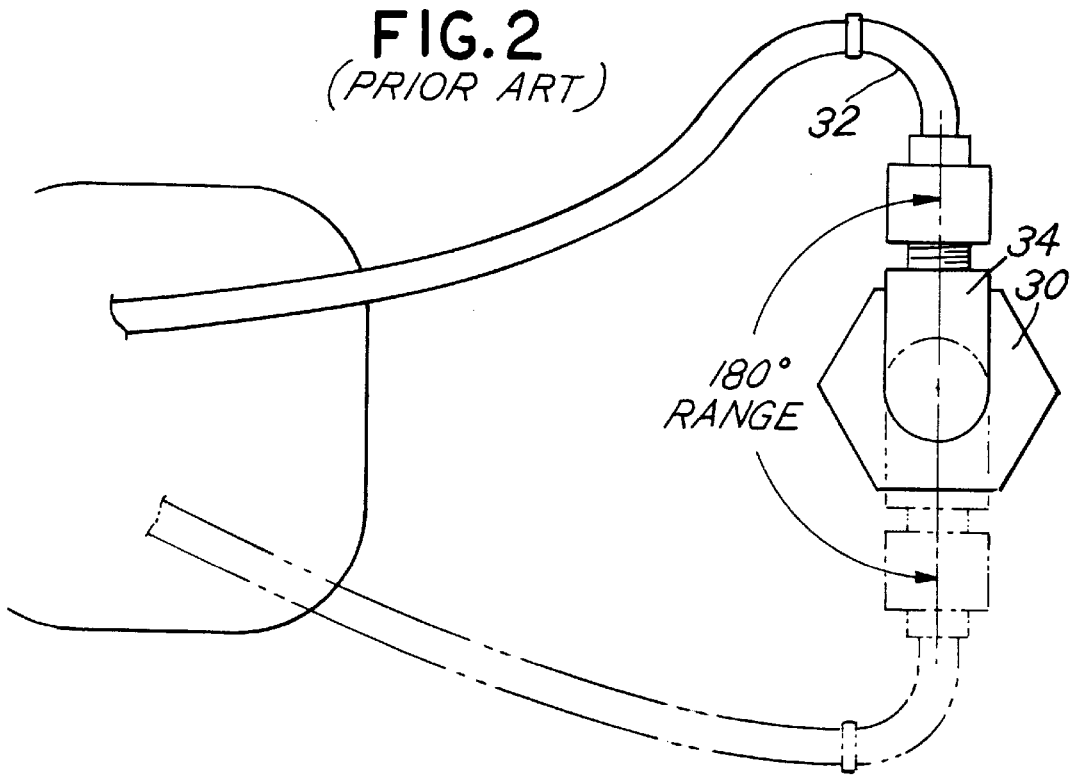
FIG. 2 is a plan view of a typical prior art chip detector assembly utilized, for example, in the environment of FIG. 1.

FIG. 2 illustrates a typical prior art chip detector assembly which includes the chip detector 30 to which a right angle connector 34 and lead wire 32 are attached. Wire 32 extends through the right angle connector 34 and ultimately connects to detection circuitry. Typically the chip detector 30 may be attached to the valve body member 28 so as to have one of two orientations. These two typical orientations are illustrated in FIG. 2 and are indicated as being at 180° from one another. In FIG. 2 a first position or orientation is illustrated in solid lines. A second position is illustrated in phantom.

The construction of FIGS. 1 and 2, which is a prior art construction, is illustrated in greater detail in FIGS. 3 through 6. As shown in FIGS. 3 through 6, valve body member 28 includes a threaded housing having threads 40 which are provided to permit threadable attachment of the member 28 to a gearbox housing, for example. The valve body member 28 includes a throughbore or through passage 42 to the interior of the gearbox housing. Chip detector 30 includes a generally cylindrical core 44 with axis 81. Core 44 includes a magnetic member which is retained within the cylindrical opening 42 when the chip detector 30 and body member 28 are assembled.

The core 44 of the chip detector 30 further includes a first radially outwardly extending, flat sided flange 46 and an oppositely extending, second radially outwardly extending, flat sided flange 48. The extending flanges 46 and 48 extend in opposite directions from the core 44 and are adapted to fit through a congruently shaped opening or slot 50 defined in the end of the valve body member 28.

Each flange 46, 48 includes a relief or cutout portion which defines a valve body member engaging surface 49, 51 on opposite sides of the center line axis 81 of core 44. Surfaces 49, 51 are parallel and spaced from one another by the width of slot 50. Core 44 has a circular cross section so that the entire core 44 may be rotated relative to the body member 28. Four lands 53, 55, 57, 59 spaced at 90° intervals about the core 44 are defined by the circular core 44 and flanges 46, 48. The core 44 thus has a circular cross section with a diameter equal to or less than the width of slot 50. The core 44 when inserted into bore 42 is typically biased axially by a spring member, such as spring 52, outward from the bore 42. Inserting the core 44 into the cylindrical opening 42 against the force of the spring 52 will result in compression of the spring 52.

A circular groove or slot 56 is defined on the inside surface of the bore 42 of member 28. The diameter of slot 56 equals the distance between the ends of flanges 46, 48. The sides of slot 56 overlap the lands 53, 55, 57, 59 except when the lands 53, 55, 57, 59 are rotated 90° from the position shown in FIG. 3 or are in the position of FIG. 3.

To assemble the chip detector assembly, the core 44 is inserted into opening 42 against the biasing force of the spring 52 so that the flanges 46 and 48 will inwardly fit through the slot 50 to a maximum extent. Lands 53, 55, 57, 59 are then aligned with the outside surface of slot 56. The core 44 may then be rotated in a clockwise sense as depicted in FIG. 6. The spring 52 continuously biases or maintains the chip detector 30 biased outwardly along axis 81.

As the core 44 is rotated through an angle up to 90°, the lands 53, 55, 57, 59 ride on the side surface of slot 56 being biased by spring 52. Upon reaching a clockwise rotation of 90°, the lands 53, 55, 57, 59 again become positioned within the slot or opening 50. Spring 52 then biases the core 44 axially outward so that the core 44 moves axially and the surfaces 49, 51 become aligned with the edges of slot or opening 50. The lands 53, 55, 57, 59 thus become totally disengaged from the slot 56. The chip detector 30 is then locked in the valve body member 28 as the flanges 46, 48 are retained in slot 56, and core 44 becomes non-rotatable due to surfaces 49, 51 being engaged with the sides of slot 50.

Chip detector 30 may be released by pushing axially on the chip detector 30 against the biasing force of the spring 52 and then rotating the chip detector in a counter clockwise sense (90° rotation). It will be noted that with this described prior art construction, the chip detector 30 (i.e., radial flanges 46, 48) may be inserted into the slot 50 in any one of two orientations so as to provide for alignment of the chip detector 30 in either of the two orientations depicted in FIG. 2.

FIGS. 7 through 14 depict the improved chip detector assembly construction of the present invention. Referring to FIGS. 7 through 14, there is illustrated a chip detector assembly having a valve body member 70 which is generally cylindrical in shape and includes an outer thread 72 so that the valve body member 70 may be threadably engaged into a gearbox housing, engine block, or the like. The valve body member 70 includes a hexagonal head 74 which facilitates tightly threading the body member 70 into a gearbox housing, for example. A chip detector 76 is engaged with the housing 70 as described in greater detail below.

Figure 7:
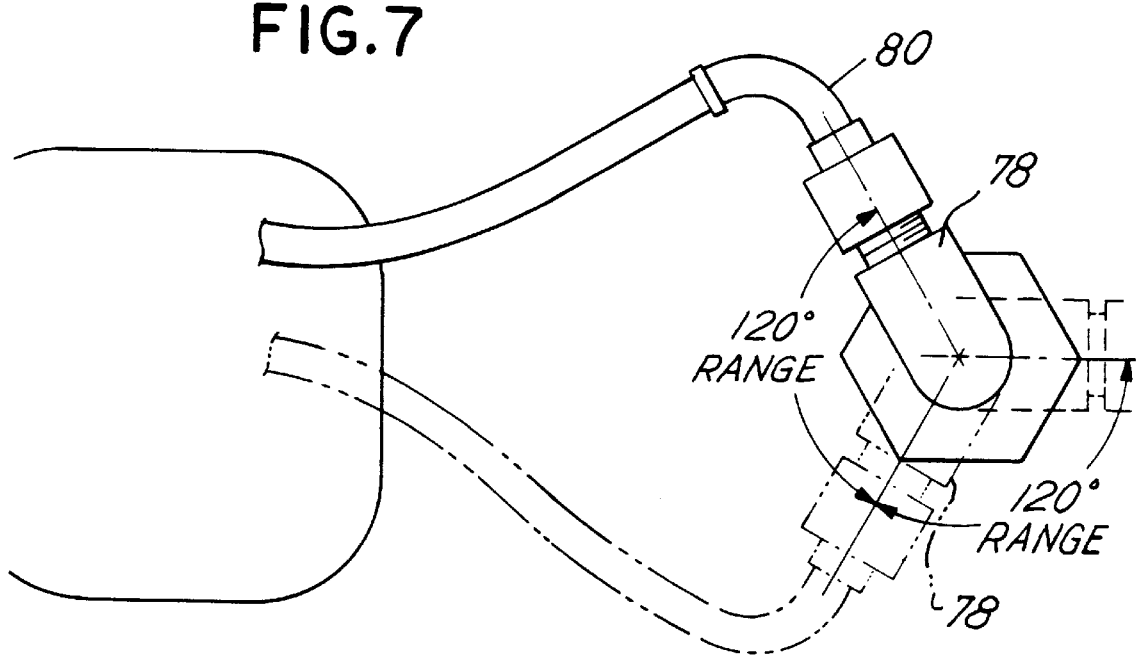
FIG. 7 is a perspective view of the improved chip detector assembly of the present invention incorporated in a typical environment.

The chip detector 76 includes a right angle connector 78 which has a lead wire 80 extending therethrough. The lead wire 80 connects a magnetic member 100 associated with the chip detector. As depicted in FIGS. 7 and 8, the chip detector 76 is insertable into the valve body member 70 and may be oriented in any one of three positions which are 120° apart or, in other words, equally spaced one from the other with respect to rotation about a central axis 82. FIGS. 8 through 14 illustrate in greater detail the specific construction of the connection mechanism which permits the three position engagement of the chip detector 76 to the valve body member 70.

Referring to the figures, the valve body member 70 includes a central through passage or throughbore 84. A compression spring 86 is retained in the throughbore 84 by means of an inwardly radially extending, circumferential flange 88. Spring 86 provides a biasing force along axis 82 against chip detector 76 positioned in the bore 84.

The valve body member 70 further includes an entry end 90 to bore 84 having an internal circular slot or groove 92 defined by a cylindrical surface 92A with spaced side surfaces 92B, 92C. Overlying the groove 92 is a generally equilateral triangular window 94. The groove 92 has an effective diameter which is slightly greater than the maximum effective diameter of a radial flange 104 of detector 76. Thus, the flange 104 may rotate in slot or groove 92 when the valve body member 70 (i.e. bore 84) receives the chip detector 76 (i.e., body section 98 described below).

The chip detector 76 includes a head 97 at one end and a cylindrical magnetic chip holder body section 98 at the opposite end compatible with bore 84 of member 70. A magnetic member 100 is positioned in the end of the body section 98, and a lead 102 connects to the lead wire 80 through the right angle connector 78.

Figure 10:
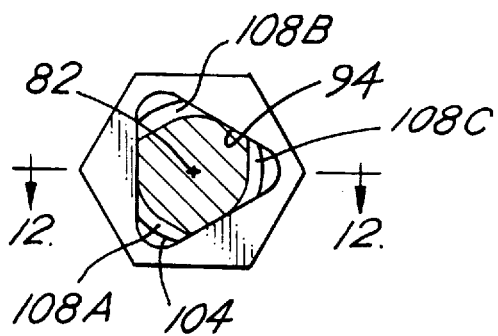
FIG. 10 is a cross sectional view of the chip detector assembly shown in FIG. 9 taken along the line 10—10.

The chip detector 76 futher includes an outwardly radially extending, equilateral triangular shaped flange 104. The flange 104 has a shape as illustrated in FIG. 10 which is generally congruent with the shape of the triangular window 94. The window 94, however, is dimensionally slightly larger so that the flange 104 can slidably pass therethrough as detector 76 (i.e. section 98) is placed into bore 84. The specific triangular shape of the flange 104 in plan view as shown in FIG. 10, is variable, though the shape is that of an equilateral triangle in the preferred embodiment. The corners of the triangular shaped flange 104 may be rounded so that flange 104 comprises a triangle with rounded corners in plan view.

The core or body section 98 of chip detector 76 includes a circumferential land 106 which fits against the biasing spring 86. Thus as the detector 76 is inserted into the cylindrical passage 84, it compresses the biasing spring 86. The biasing spring 86 then tends to bias the chip detector 76 axially along axis 82 outward from the cylindrical passage 84.

The flange 104 includes three relief cuts, one cut or relief being associated with each lobe or corner 108A, 108B, 108C of flange 104. The relief portions of each lobe 108A, 108B and 108C define flat surfaces 109A, 109B, 109C, respectively, which lie on chords of a circle centered on axis 82. A separate arcuate or circular, leading edge surface 111A, 111B, 111C of core 98 is associated with each flat surface 109A, 109B, 109C. The leading edge surfaces 111A, 111B and 111C are typically on a common cylindrical surface having a radius centered on axis 82 and having a radius approximately equal to the minimum radius of the chord surfaces 109A, 109B, 109C. The leading edge surface 111A, 111B, 111C may also be flat. Of course, the lobes 108A, 108B, 108C have a radius greater than the minimum radius of the chord surfaces 109A, 109B, 109C.

Figure 11:
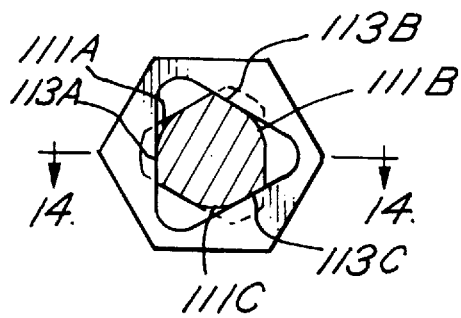
FIG. 11 is a cross sectional view taken along the same section line as FIG. 10 wherein the fitting has been rotated approximately 60°.
Figure 12:
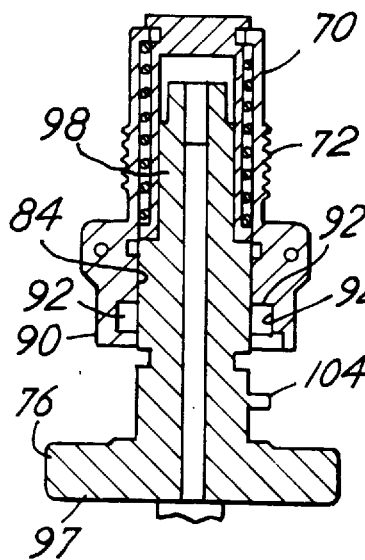
FIG. 12 is a cross sectional view of the chip detector assembly of FIG. 10 taken along the line 12—12.
Figure 13:
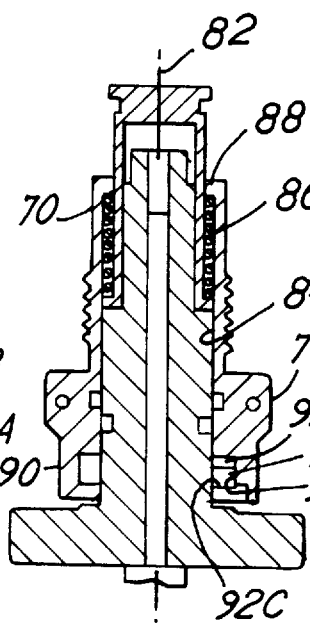
FIG. 13 is a cross sectional view similar to FIG. 12 wherein the chip detector has been inserted against the force of a biasing spring into the valve body member.
Figure 14:
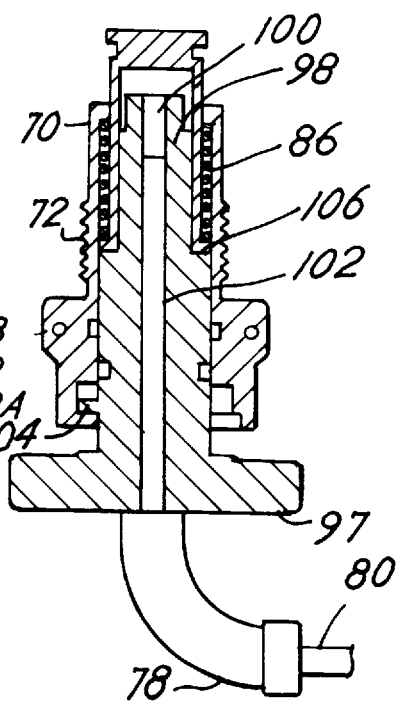
FIG. 14 is a cross sectional view similar to FIGS. 12 and 13 wherein the chip detector has been rotated 60° and thus wherein the section is taken along the line 14—14 in FIG. 11.

The chip detector 76, and more particularly, the triangular flange 104, is aligned congruently and then fitted through the window 94 against the biasing force of the spring 86. The chip detector 76 may then be rotated approximately 60° as illustrated in FIG. 11.

Upon initial insertion of flange 104 through window 94, the chip detector 76 is manually moved in the direction of axis 82 against the force of the biasing spring 86 to the full extent of insertion. When fully inserted, the detector 76 may be rotated in one direction as determined by the position of the leading edge surfaces 111A, 111B, 111C. Thus clockwise rotation may ensure when the leading edge surfaces are on the side of the respective flat surface 109A, 109B, 109C depicted in the drawing (i.e. the same as a right hand thread). When being rotated, lands 113A, 113B, 113C will be biased against the side 92C of groove 92 until the detector 76 rotates 60°. Upon 60° rotation, the chordal surfaces 109A, 109B 109C will become aligned with the straight sides of the window 94.

When the surfaces 109A, 109B 109C are aligned as described, the biasing spring 86 will cause the chip detector core 76 to move axially outward. The surfaces 109A, 109B, 109C will then be directly opposed to the sides of window 94 preventing further rotation of the chip detector 76 and effectively locking the chip detector 76 in place. The chip detector 76 may be removed by reversing the process. That is, manually pushing the chip detector 76 axially against the biasing force of spring 86 will enable reverse rotation of chip detector 76 and alignment of lobes 108A, 108B, 108C and the sides of windows 94, 104. Then chip detector 76 may be removed from member 70.

In sum, the flange 104 may be envisioned as comprised of first, second and third overlying plates wherein the bottom plate has an equilateral triangle profile and the middle plate has a hexagonal profile. The top plate overlies the middle plate except that it further includes a profiled leading edge preferrably arcuate and having the same radius as the perpendicular bisector of the middle plate surfaces 109.

Thus the flange construction provides that each lobe 108 of flange 104 lies on the vertex of an equilateral triangle. Also, each lobe has a relief cutout section to define sides of an equilateral triangle rotated by 60° from the flange 104. Finally, the chip detector 76 includes an adjacent core section which is at least partially curved or flat so that the chip detector 76 may be rotated to align the various triangular sections as desired.

The chip detector 76 may be inserted into the valve body member 70 so that the flange 104 will fit within the window 94 and coact therewith in any one of three orientations which are 120° apart. In this manner, the right angle connector 78 will be oriented in any one of three directions as illustrated in FIG. 7.

In operation, the valve body member 70 is positioned within a gearbox housing, for example. Thereafter, the chip detector 76 is engaged in a desired orientation with the valve body member 70. The lead wire 80 is thus positioned in a most desired orientation of three optional orientations provided by the construction of the invention. Magnetic chips then attracted to the magnetic material of magnetic member 100 will provide a signal through the lead 102 and connected lead 80 passing through the connector 78. The chip detector 76 may be easily removed and replaced and reoriented within the valve body member 70.

There are various alternative constructions which are within the scope of the invention. The particular construction of the flange 104 and the shape and size of the window 94 for example may be varied as may the shape and configuration of the body member 70 as well as the chip detector 76. Thus while there has been set forth a preferred embodiment of the invention, it is understood that the invention is to be limited only by the following claims and their equivalents.

What is claimed is:

1. In a chip detector assembly of the type comprising a valve body member for attachment to a block having a chamber for fluid in which chips are to be detected, said valve body member including a cavity therethrough, said chip detector assembly further including a chip detector for insertion into the cavity of the valve body member, said chip detector rotational about an axis in the cavity to lock and unlock the chip detector in the cavity, said chip detector including a magnetic member for attracting metal chips from the chamber, said chip detector further including means for attaching the chip detector to the valve body member, said chip detector also including transmission means for transmitting information from the magnetic member; the improvement comprising, in combination:

a-three position connection construction for maintaining the chip detector engaged to the valve body member in the cavity thereof, said connection construction including a generally equilateral, radial triangular flange on the chip detector; a generally equilateral triangular window in the valve body member defined at one end of the cavity, a circular recess in the valve body member adjacent the window, said recess having sides and a diameter at least equal to the maximum effective diameter of the triangular flange, said triangular window having sides substantially congruent within the sides of the triangular flange, said flange, window and circular recess all being coaxial when the chip detector is engaged with the valve body member, and a biasing member for biasing the fitting axially in the cavity to engage the flange with a side of the recess, whereby the chip detector may be axially inserted into the valve body member with the flange and window overlying one another and subsequently the chip detector may be moved counter to the force of the biasing member to thereby fit through the window and rotated to engage the flange with a side of the recess to hold the chip detector, said chip detector being insertable and retained in any one of three, equally spaced positions.

2. The chip detector assembly of claim 1 wherein the corners of the flange and window are rounded.

3. The chip detector assembly of claim 1 wherein the flange further includes a lobe defined at each vertex of the triangular flange with a relief cutout for each lobe defining a locking side of an equilateral triangle of equal dimension to that of the flange, and said detector further including at least one surface adjacent each locking side which permits rotation of the chip detector and subsequent axial movement of the locking sides for engagement with the sides of the window.

* * * * *